United States Patent
Klieber et al.

(10) Patent No.: US 10,005,377 B2
(45) Date of Patent: Jun. 26, 2018

(54) ARMREST DEVICE

(71) Applicant: GRAMMER AG, Amberg (DE)

(72) Inventors: Daniel Klieber, Amberg (DE); Thomas Haller, Ursensollen (DE); Johann Meier, Fensterbach (DE)

(73) Assignee: GRAMMER AG, Amberg (DE)

( * ) Notice: Subject to any disclaimer, the term of this patent is extended or adjusted under 35 U.S.C. 154(b) by 0 days. days.

(21) Appl. No.: 15/421,623

(22) Filed: Feb. 1, 2017

(65) Prior Publication Data
US 2017/0217343 A1     Aug. 3, 2017

(30) Foreign Application Priority Data

Feb. 3, 2016    (DE) ........................ 10 2016 101 914

(51) Int. Cl.
| | |
|---|---|
| *B60N 2/75* | (2018.01) |
| *B60N 2/46* | (2006.01) |
| *B60N 2/90* | (2018.01) |

(52) U.S. Cl.
CPC ............ *B60N 2/4646* (2013.01); *B60N 2/77* (2018.02); *B60N 2/773* (2018.02); *B60N 2/929* (2018.02)

(58) Field of Classification Search
CPC ...... B60N 2/4646; B60N 2/443; B60N 2/763; B60N 2/773; B60N 2/777; B60N 2/75
See application file for complete search history.

(56) References Cited

U.S. PATENT DOCUMENTS

| | | | |
|---|---|---|---|
| 5,806,825 A * | 9/1998 | Couasnon ............ | B60N 2/0705 248/429 |
| 7,077,468 B2 * | 7/2006 | Maierholzner ...... | B60N 2/4646 220/348 |
| 9,156,386 B2 * | 10/2015 | Cinco .................. | B60N 2/4646 |
| 9,199,562 B2 * | 12/2015 | Skapof ................. | B60N 2/4606 |
| 2010/0008606 A1 * | 1/2010 | Craddock ............. | B60N 2/443 384/26 |
| 2015/0298588 A1 * | 10/2015 | Lorey ................... | B60N 2/4646 297/411.35 |

FOREIGN PATENT DOCUMENTS

| | | |
|---|---|---|
| DE | 112008002079 | 7/2010 |
| DE | 102014005620 A1 | 4/2014 |
| EP | 0958765 | 11/1999 |
| WO | WO 2008/023181 | 2/2008 |

OTHER PUBLICATIONS

Search Report prepared by the German Patent Office dated Oct. 14, 2016, for German Patent Application No. 102016101914.3.
Extended Search Report for European Patent Application No. 17153268.2, dated Jun. 29, 2017, 3 pages.

* cited by examiner

*Primary Examiner* — Philip F Gabler
(74) *Attorney, Agent, or Firm* — Sheridan Ross PC

(57) ABSTRACT

Armrest device, in particular for commercial vehicle seats, having a guide rail system for guiding a displacement movement of a first rail relative to a second rail which can be connected to the armrest device, in a displacement direction, wherein the displacement movement of the first rail can be arrested by the engagement of a locking element of a locking device in at least one recess in the first rail, wherein the locking device is rigidly connected to the armrest device by a first end and can be deflected in a height direction by a second end, the locking element engaging in the recess in a non-deflected position of the locking device.

6 Claims, 11 Drawing Sheets

ARMREST DEVICE

CROSS-REFERENCE TO RELATED APPLICATIONS

This application claims the benefit of German Patent Application No. 10 2016 101 914.3 filed Feb. 3, 2016, the entire contents of which are incorporated herein by reference.

FIELD

The invention relates to an armrest device, in particular for commercial vehicle seats, having a guide rail system for guiding a displacement movement of a first rail relative to a second rail which can be connected to the armrest device, in an adjustment direction, it being possible to arrest the displacement movement of the first rail by the engagement of a locking element of a locking device into at least one recess in the first rail.

BACKGROUND

Armrest devices of this type are known from the prior art, in which devices for example an armrest cushion part, onto which the vehicle driver's arm can be placed and on which corresponding operating elements are arranged, is mounted in a displaceable manner by means of a guide rail system. Due to the fact that the armrest is permanently movable, which can be disturbing during operation, it is advantageous to disable the displacement movement.

For this purpose, a locking device is provided which can arrest the displacement movement. Said locking device comprises swivellable levers which can engage laterally into corresponding recesses in the guide rail system and can thus arrest the displacement movement. However, the lateral arrangement significantly increases the lateral space requirement for the locking device and this can have a disruptive effect during the operation of operating elements which are arranged on the side of the vehicle seat.

SUMMARY

It is therefore the object of the present invention to provide an armrest device having a space-saving locking device which is simple to operate.

This object is achieved according to the features of claim 1. Advantageous embodiments of the invention are set out in the dependent claims.

The basic concept of the invention is to provide an armrest device, in particular for commercial vehicle seats, having a guide rail system for guiding a displacement movement of a first rail relative to a second rail which can be connected to the armrest device, in an adjustment direction, it being possible to arrest the displacement movement of the first rail by the engagement of a locking element of a locking device into at least one recess in the first rail, the locking device being rigidly connected to the armrest device by a first end and being deflectable in a height direction by a second end, the locking element engaging in the recess in a non-deflected position of the locking device.

The first end of the locking device is preferably arranged in a stationary manner with respect to the armrest device by means of the rigid connection, it being advantageously possible to realise a rigid connection by means of a rivet connection, a screw connection or by another connection method.

However, the second end of the locking device is at most in releasable contact with the armrest device and can therefore be deflected at least in a height direction.

A "height direction" is preferably understood as a direction vertical to the adjustment direction. The "adjustment direction" is understood as the direction in which the first rail can be displaced or shifted.

The invention provides that the locking element of the locking device engages in the recess in a non-deflected position in order to arrest the displacement movement of the first rail relative to the second rail. However, if the locking device is in a deflected position, the locking element no longer engages in the recess in the first rail. However, it should be noted here that a "deflected position" is to be understood as meaning that the locking element no longer engages in the recess. Namely, if the locking device is moved from a non-deflected position into a deflected position by deflecting the second end, then the locking element continues to engage at least in part in the recess, so that the displacement movement is still arrested.

According to a preferred embodiment, in particular the second end of the locking device can be deflected more easily if the locking device is of an elongate configuration. In this respect, the elongate locking device advantageously extends in the adjustment direction.

Here, an "elongate configuration" is understood as meaning that the longitudinal extent of the locking device is great compared to the height extent and to the width extent of the locking device. Therefore, it is possible to deflect the second end of the locking device relatively easily by means of the elongate configuration of the locking device. In this respect, the force required for deflection can be reduced by extending in the adjustment direction.

According to a preferred embodiment, the locking device can be simplified in terms of construction if it is configured to be elastically deformable at least in part.

In this respect, an elastic deformation is particularly desired in the height direction. Therefore, due to an elastic deformation of the locking device, the locking device is configured such that it resets automatically, so that following a deflection of the locking device by a deflection of the second end, the locking device can be returned independently and automatically into the non-deflected state.

According to a preferred embodiment, it is advantageous if the locking device consists at least in part of a spring steel sheet and/or of spring steel, the locking element of the locking device consists particularly advantageously of a material which is rigid or stiff.

Due to the configuration at least in part of the locking device with a spring steel sheet and/or spring steel, the locking device can be configured to be elastically deformable, while simultaneously minimising the production costs by reducing material and components.

According to a further preferred embodiment, the locking device is arranged at least in part below the second rail, seen in the height direction.

The space requirement of the locking device can be further reduced by an arrangement of this type of the locking device below the second rail. It is advantageously also conceivable for the locking device to also be arranged below an upper surface of the armrest device. In this case, the second rail is arranged above the upper surface.

Furthermore, at least the second rail preferably has at least one opening, through which the locking device projects so that it can engage in the recess in the first rail.

If the locking device is also arranged below the upper surface of the armrest device, then the upper surface of the armrest device also has an opening, through which the locking element projects.

Guide rail systems of this type generally also have stop elements, in which case for example the second rail has at least one lower stop element and the first rail has at least one upper stop element, which stop elements can interact with one another to thus restrict the displacement movement in the adjustment direction and to secure the guide rail system.

According to a preferred embodiment, arranged on an edge of the opening is at least one lower stop element of the second rail, which stop element interacts with the at least one upper stop element of the first rail. The at least one lower stop element and the at least one upper stop element are advantageously arranged along the adjustment direction.

The displacement movement is in no way disturbed or hindered by the locking element due to this type of arrangement of the lower stop elements.

According to a further preferred embodiment, the second end of the locking device can be deflected in a particularly advantageous manner if a Bowden cable can be connected to the second end of the locking device, in order to deflect the second end and accordingly the locking device by actuating the Bowden cable.

Tensile forces can be transmitted particularly effectively by a Bowden cable. Therefore, by actuating the Bowden cable, it is possible to deflect the second end particularly smoothly. In this respect, the Bowden cable can be actuated in a known manner.

According to a preferred embodiment, the locking element can engage effectively in the recess in the first rail if the locking element substantially extends in the height direction.

The arresting of the displacement movement by the engagement of the locking element in a recess can be further improved if, according to a preferred embodiment, the locking element has on a first end at least one surface which slopes outwards in the height direction.

More preferably, the locking element has on a first end at least two surfaces which slope outwards in the height direction.

Further advantageous embodiments are set out in the subclaims.

BRIEF DESCRIPTION OF THE DRAWINGS

Further objectives, advantages and functionalities of the present invention can be inferred from the following description in conjunction with the drawings, in which.

DETAILED DESCRIPTION

Figure 1A:
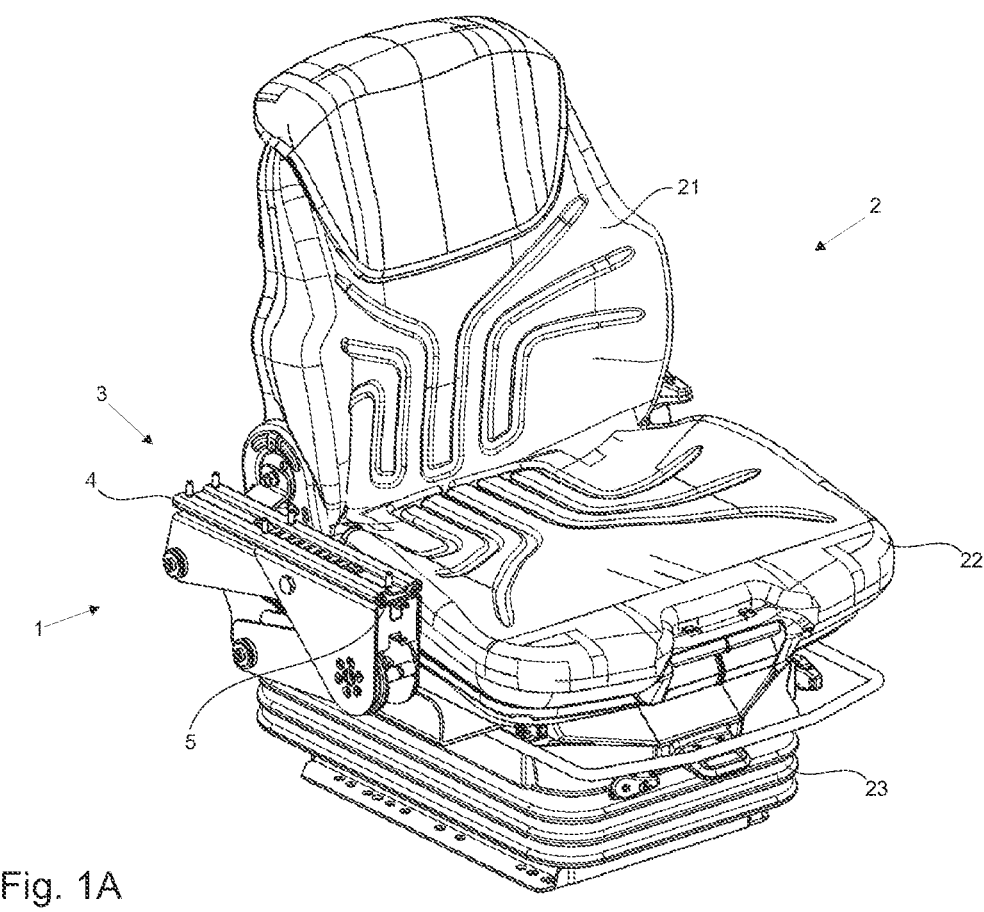
FIG. 1A is a perspective view of an armrest device, mounted on a vehicle seat.
Figure 1B:
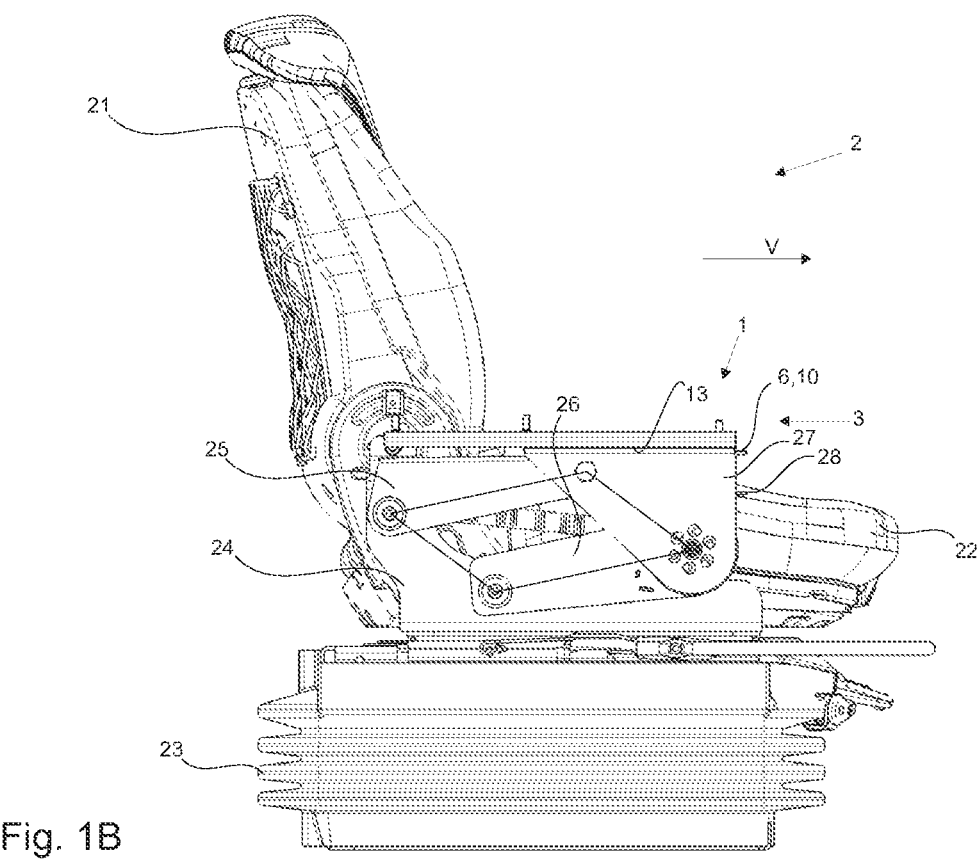
FIG. 1B is a side view of the armrest device according to FIG. 1A.
Figure 1C:
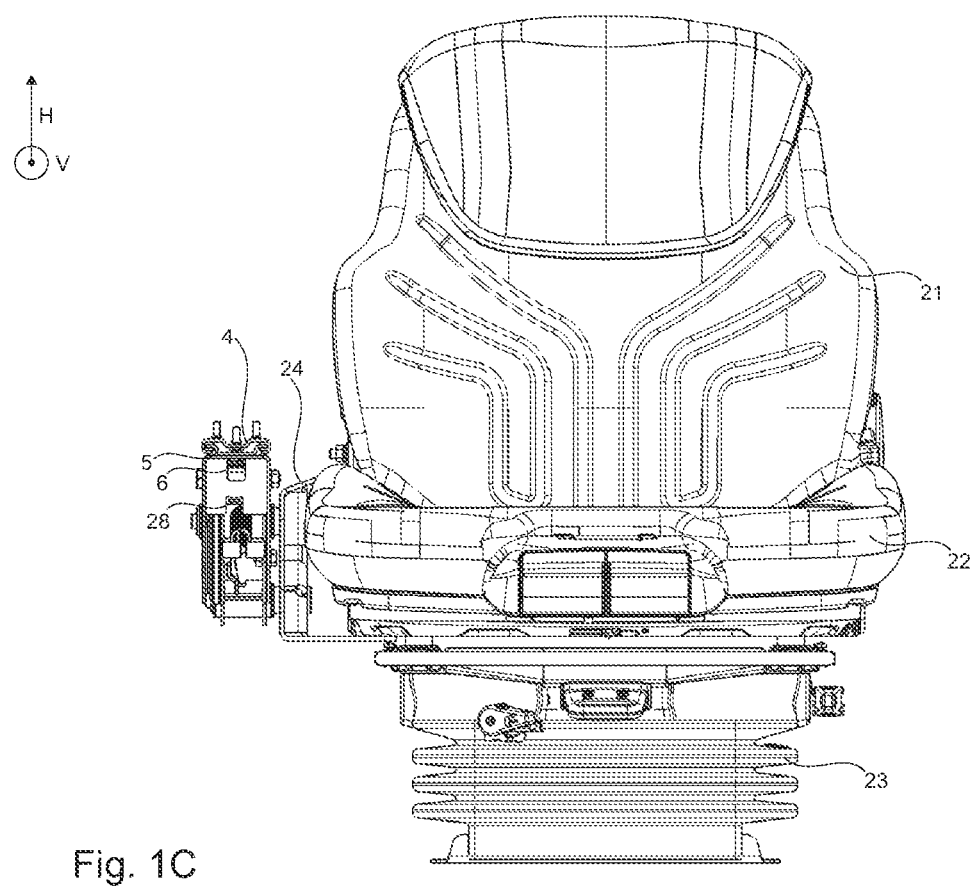
FIG. 1C is a front view of the armrest device according to FIG. 1A.

FIG. 1A to 1C show an armrest device 1 which is arranged on a vehicle seat 2, in particular on a commercial vehicle seat 2. The vehicle seat 2 comprises a backrest 21, a seat part 22 and a seat substructure 23 which is suitable for suspension and for the displacement of the seat part 22.

FIG. 1A is a perspective view of the arrangement. As is usual in the commercial vehicle sector, the armrest 1 is arranged on the side of the seat part 22 and on the side of the backrest 21.

FIG. 1B is a side view of the vehicle seat of FIG. 1A. As can be seen, the armrest device 1 can be connected to the vehicle seat 2 by an armrest attachment 24. In this respect, the armrest device 1 comprises a first rocker 25, a second rocker and an armrest support 27 which is connected to the first rocker 25 and to the second rocker 26 and forms a parallelogram, so that with a height adjustment of the armrest device 1, the upper surface 13 of the armrest support 27 is still oriented parallel to a body floor (not shown here).

It can also be seen from FIG. 1B that the locking device 6 extends further in the adjustment direction V by its second end 10 than the upper surface 13. As a result, the second end 10 can be deflected more easily and the locking device 6 can thus also be deflected more easily to move the locking device out of a non-deflected position 11 into a deflected position 12. Here, it is conceivable, for example, to deflect the second end 10 manually. Furthermore, a Bowden cable 15 (not shown here) can thus also be connected more easily to the second end 10. If a Bowden cable 15 is provided, it is advantageous to provide a Bowden cable guide 28 to restrict the freedom of movement of the Bowden cable 15 and to thereby prevent the Bowden cable 15 from being damaged by other construction components. The following figures provide a detailed view of the Bowden cable guide 28.

It can also be seen that the guide rail system 3 is arranged on the upper surface 13 of the armrest support 27. During a height adjustment of the armrest support, the guide rail system 3 is also moved in parallel and is still oriented in parallel.

FIG. 1C is a front view of the vehicle seat of FIGS. 1A and 1B.

Figure 2:
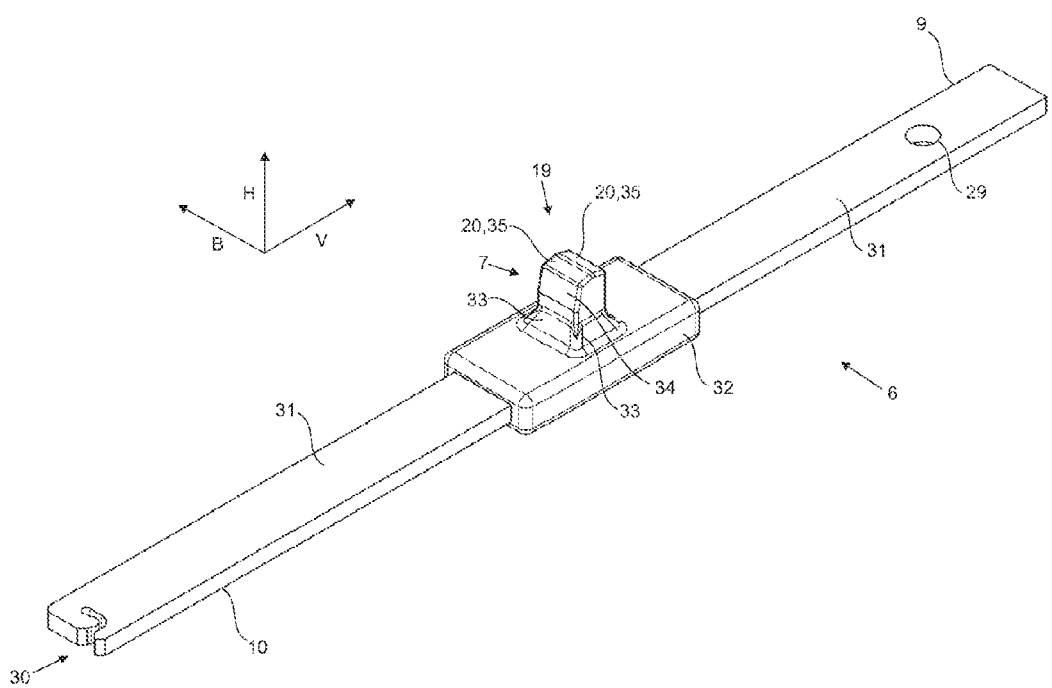
FIG. 2 shows a locking device with a locking element.

FIG. 2 shows a preferred embodiment of the locking device 6. As can be seen, the locking device 6 is of an elongate configuration and extends in the adjustment direction V. Arranged at the first end 9 is a hole 29 or a passage 29 by which the locking device 6 can be rigidly connected to the upper surface 13 and/or to the second rail 5 by a rivet connection or a screw connection. Arranged at the first end is a Bowden cable recess 30 into which the Bowden cable 15 (not shown here) can be hooked and can thus be connected to the second end 10.

Here, the locking device 6 is configured at least in part as a spring steel sheet and/or as a spring steel 31, subject to the dimensioning of the locking device 6. The following figures show a preferred embodiment of the locking device 6.

The locking device 6 also comprises a locking element 7 which substantially extends in the height direction and is arranged such that it runs vertically to the adjustment direction V. Here, the locking element 7 is connected to the locking device 6 by a locking element support 32. The support 32 is configured in a cuboid shape, the spring steel sheets 31 being connected to the support 32. However, the support 32 can also be considered as part of the locking element 7 if the support 32 and the locking element 7 are produced from one piece of material.

It can also be seen that at a first end 19, the locking element 6 has two surfaces 20 which slope outwards, seen in the adjustment direction. Here, the first end 19 is the upper end 19 of the locking element 7, seen in the height direction H. The surfaces 20 can have resulted as bevels 35 of the locking element 7. The surfaces 20 are advantageously rounded along their peripheral lines or peripheral surfaces to minimise the risk of injury. The sloping surfaces 20 make it easier for the locking element 7 to engage in the recess 8 (not shown here), because the locking element 7 can slide into the recess 8 by the surfaces 20 in the recess 8.

The locking element 7 also has widening portions 33, 34 which increase the cross section downwards, seen in the height direction H, which cross section is located in a plane spanned by the adjustment direction V and by a width direction B. Therefore, the locking element 7 slides into the recess 8 until the cross-sectional surface of the locking element 7 substantially corresponds to the surface of the recess 8, thereby making it possible to ensure a secure locking of the displacement movement.

Figure 3A:
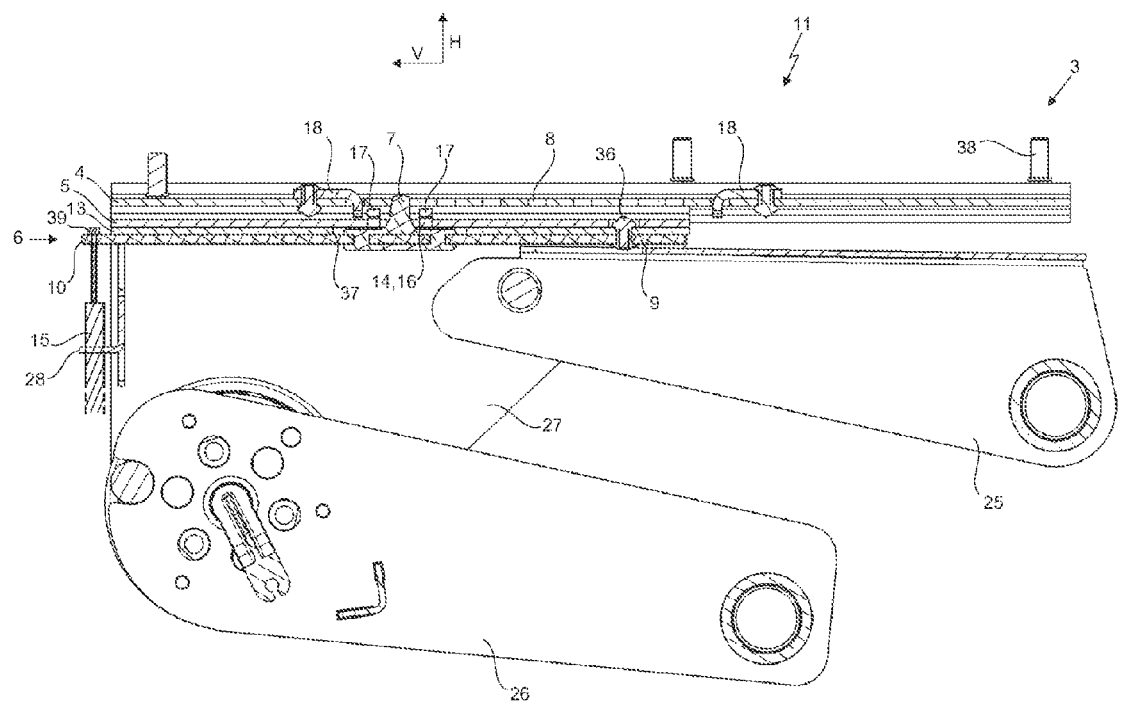
FIG. 3A shows the armrest device with a locking device in a non-deflected position.
Figure 3B:
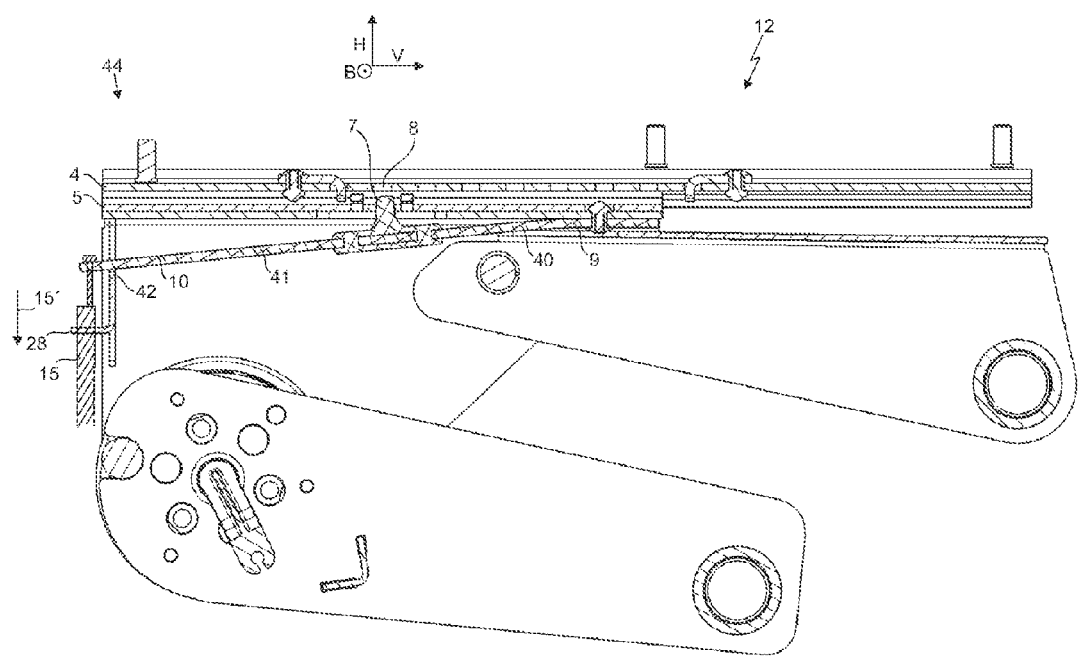
FIG. 3B shows the armrest device with a locking device in a deflected position.

FIGS. 3A and 3B are enlarged side views of the armrest device 1, FIG. 3A showing the locking device 6 in a non-deflected position 11 and FIG. 3B showing the locking device 6 in a deflected position 12.

Here, the locking device 6 is arranged below the upper surface 13 and the second rail 5, seen in the height direction H. Therefore, the second rail must have a first opening 14 and the upper surface 13 must have a second opening 37 through which the locking element 7 can project in order to be able to engage in one of the recesses 8. In this respect, the locking device 6 is connected to the upper surface 13 at a first end 9 by means of a rivet connection 36. Furthermore, it is conceivable for the rivet connection 36 to also be provided to connect the second rail 5 to the upper surface 13 and also to the locking device 6.

In addition, the guide rail system 3 has a first rail 4 which is displaceable along the adjustment direction V relative to the second rail 5, the first rail having upper stop elements 18 and the second rail having lower stop elements 17 which can interact with one another and thus secure the first rail 4 with respect to the second rail 5 and thus prevent the first rail 4 from fully detaching from the second rail 5.

The lower stop elements 17 are arranged on an edge 16 of the first opening 14, so that the displacement movement cannot be influenced in any way by the locking element 7, particularly when the locking device 6 is deflected. In this respect, the first opening is advantageously arranged such that is it situated in the centre of the second rail 5, seen in the adjustment direction V. This measure ensures the same adjustment length of the first rail backwards and forwards in the adjustment direction V.

Furthermore, a Bowden cable 15 can be seen which is connected to the second end 10 of the locking device 6 and to a Bowden cable guide 28. The size of the Bowden cable guide 28 is advantageously the same size as the sheathing of the Bowden cable 15, so that the Bowden cable 15 is held effectively by the Bowden cable guide 28. Therefore, the Bowden cable guide 28 is synonymous with a Bowden cable holder 28. Here, the Bowden cable 15 is constructed in the manner known from the prior art. In the present case, for example the Bowden cable 15 comprises a barrel nipple 39 on at least the end which can be connected to the second end 10 of the locking device 6.

As can also be seen, the locking element 7 projects through the first opening 14 in the second rail 5 and also through the second opening 37 in the upper surface 13, to thus be able to engage in the recess 8.

FIG. 3B shows the armrest device 1 in a deflected position 12. By actuating the Bowden cable 15, this actuation being indicated by arrow 15', the second end 10 of the locking device is deflected in the height direction H, the locking element 7 no longer engaging in the recess 8. Therefore, in the deflected position 12 of the locking device 6, it is possible to move the first rail 4 backwards or forwards in the adjustment direction V with respect to the second rail 5.

As can be inferred in particular from FIG. 3B, the locking device 6 is configured to be elastically deformable at least in part, particularly in the region of the first end 9. In this respect, the locking device 6 can be configured in several parts, as in the present case, and can have a first element 40 and a second element 41, in which case at least the first element 40 consists of a spring steel sheet and/or of spring steel.

At least the first element 40 is elastically deformed by the deflection of the second end 10 in the height direction H. If the Bowden cable 15 is no longer actuated, the first element 40 re-assumes its original shape and thereby returns the locking device 6 into the non-deflected position 11. It is possible to provide an end stop 42 which restricts the deflection of the second end 10 of the locking device 6 to prevent the locking device 6 from being damaged.

A sheet element 43 is advantageously provided which comprises the end stop 42 and the Bowden cable holder 28, the sheet element 43 preferably being located in a plane formed by the height direction H and by the width direction B. Furthermore, the sheet element 43 is advantageously arranged in a front region 44 of the armrest device 1, seen in the adjustment direction V.

Figure 4A:
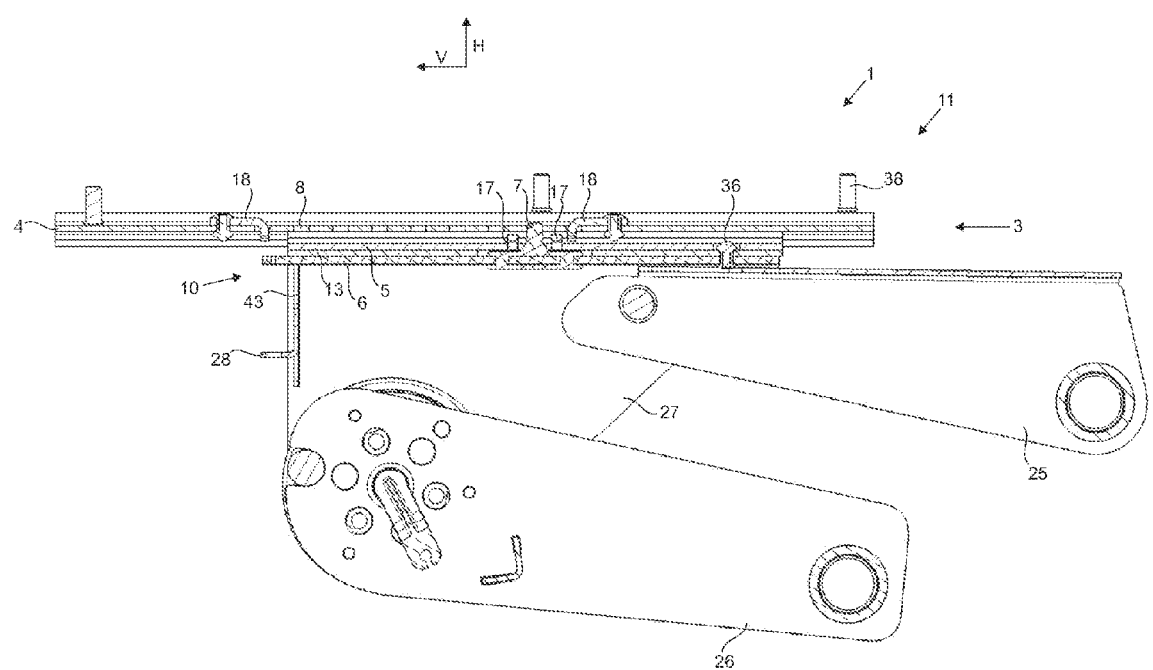
FIG. 4A shows the armrest device according to FIG. 3A with a first rail moved in the adjustment direction.
Figure 4B:
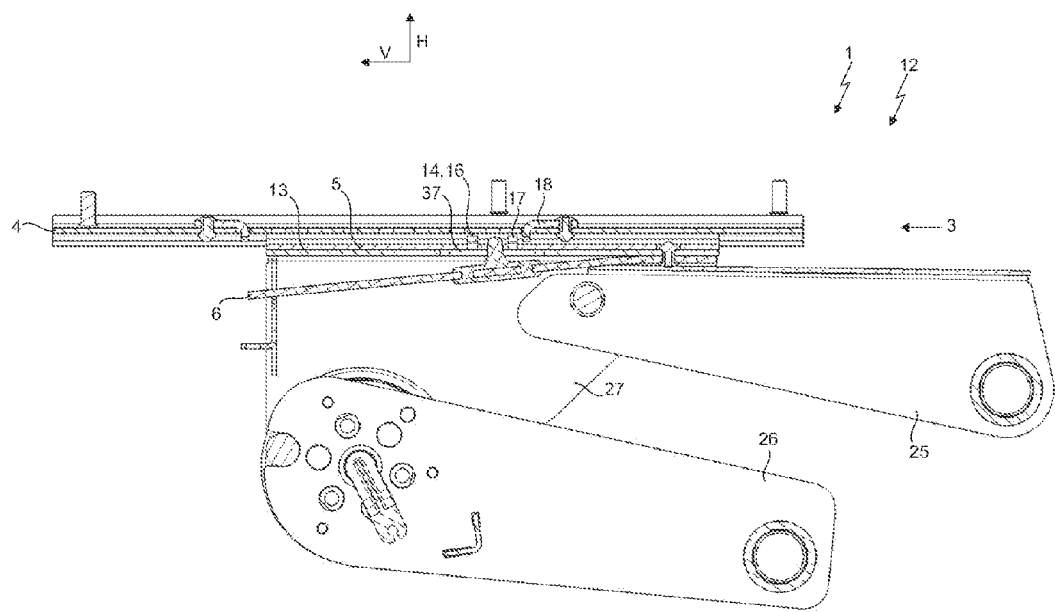
FIG. 4B shows the armrest device according to FIG. 3B with a first rail moved in the adjustment direction.

FIGS. 4A and 4B show the guide rail system 3 in a different position compared to FIGS. 3A and 3B, in that a lower stop element 17 interacts with an upper stop element 18 and the first rail 4 is moved forwards in the adjustment direction V. The Bowden cable 15 is not shown here.

Figure 5A:
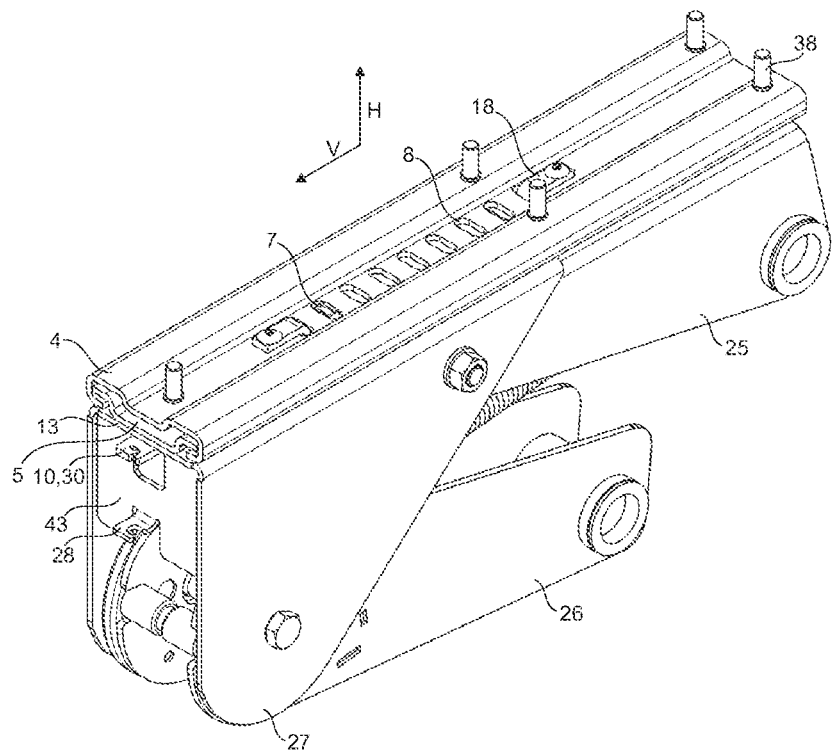
FIG. 5A is a perspective plan view of the armrest device.
Figure 5B:
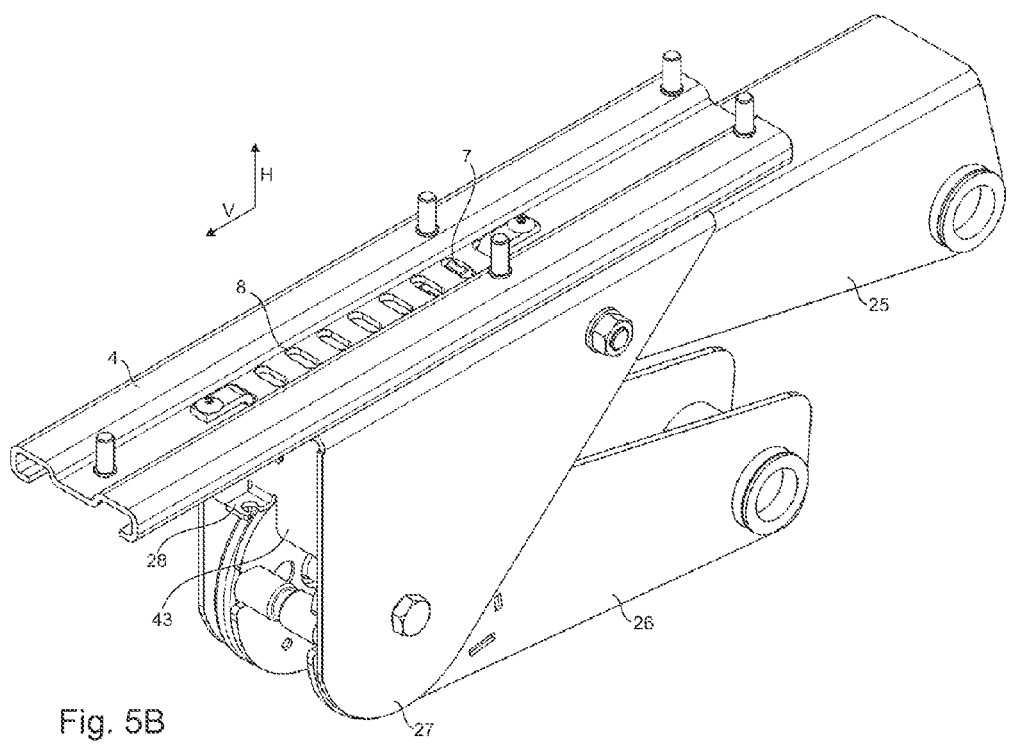
FIG. 5B shows the armrest device according to FIG. 5A with a first rail moved in the adjustment direction.

FIGS. 5A and 5B respectively show the armrest device 1 in an unswivelled position 11 and in a perspective plan view. The first rail 4 in FIG. 5B has been moved forwards in the adjustment direction V relative to the second rail 5. As can be seen from both figures, the locking element 7 engages into a recess 8 in the first rail 4, thereby arresting the displacement movement of the first rail 4 relative to the second rail 5.

Figure 6:
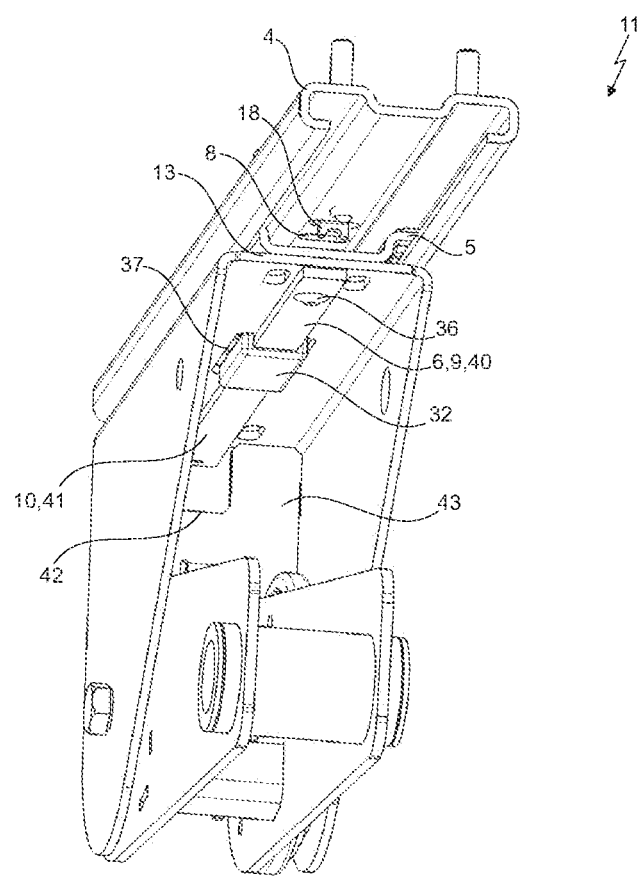
FIG. 6 is a perspective view from below of the armrest device according to FIG. 5B.

FIG. 6 is a perspective view from below of the armrest device 1 of FIG. 5B and of the locking device 6 in the non-deflected position. As can be clearly seen, the sheet element 43 has a third opening 45, so that the second end 10 of the locking device 6 can be deflected. The end of the third opening serves as the end stop 42.

All the features disclosed in the application documents are claimed as being essential to the invention provided that, individually or combined, they are novel over the prior art.

LIST OF REFERENCE SIGNS 1 armrest device
2 vehicle seat
3 guide rail system
4 first rail 5 second rail
6 locking device
7 locking element
8 recess
9 first end of locking device
10 second end of locking device
11 non-deflected position
12 deflected position
13 upper surface
14 opening
15 Bowden cable
15' actuation of Bowden cable
16 edge of opening
17 lower stop element
18 upper stop element
19 first end of locking element
20 sloping surface
21 backrest
22 seat part
23 seat substructure
24 armrest attachment
25 first rocker
26 second rocker
27 armrest support
28 Bowden cable guide
29 hole
30 Bowden cable recess
31 spring steel sheet/spring steel
32 locking element support
33 widening portion
34 widening surface
35 bevel
36 rivet connection
37 second opening
38 armrest part connection
39 barrel nipple
40 first element
41 second element
42 end stop
43 sheet element
44 front region of armrest device
45 third opening
V adjustment direction
H height direction
B width direction

The invention claimed is:

1. An armrest system for a commercial vehicle, comprising:
a first rail selectively displaceable with respect to a second rail in a longitudinal direction of the first and second rails, wherein the first rail has a plurality of apertures and the second rail has an aperture;
an arm rest connected to an upper surface of the first rail;
a locking device having a first end connected to a lower surface of the second rail, the locking device having a second end opposing the first end, and the locking device having a locking element that is aligned with the aperture of the second rail, wherein at least a portion of the locking device is elastically deformable;
wherein in a locked state, the locking element extends through the aperture of the second rail and one of the apertures of the first rail to lock the relative positions of the first and second rails in the longitudinal direction; and
wherein in an unlocked state, at least a portion of the locking device elastically deforms and the second end of the locking device deflects by a predetermined distance from the lower surface of the second rail, and the locking element is positioned below the plurality of apertures of the first rail such that the first rail is displaceable with respect to the second rail in the longitudinal direction of the first and second rails.

2. The armrest system of claim 1, further comprising:
a cable connected to the second end of the locking device and oriented substantially perpendicular to the first and second rails, wherein a force applied to the cable elastically deforms at least a part of the locking device and deflects the second end of the locking device by the predetermined distance from the lower surface of the second rail.

3. The armrest system of claim 1, wherein the locking element is positioned at a midpoint of the locking device between the first and second ends of the locking device.

4. The armrest system of claim 1, wherein the locking element is positioned on a support of the locking device, and a first steel spring sheet extends from the support to the first end of the locking device, and a second steel spring sheet extends from the support to the second end of the locking device, wherein the first and second steel spring sheets are elastically deformable.

5. The armrest system of claim 1, wherein the locking device is larger than the second rail in the longitudinal direction such that the locking device is configured to be manually deflectable into the unlocked state.

6. The armrest system of claim 1, further comprising:
an armrest support positioned between the second rail and the locking element, the armrest support having an aperture that is aligned with the aperture of the second rail, and the first end of the locking element is connected to the armrest support.

* * * * *